United States Patent Office 3,508,660
Patented Apr. 28, 1970

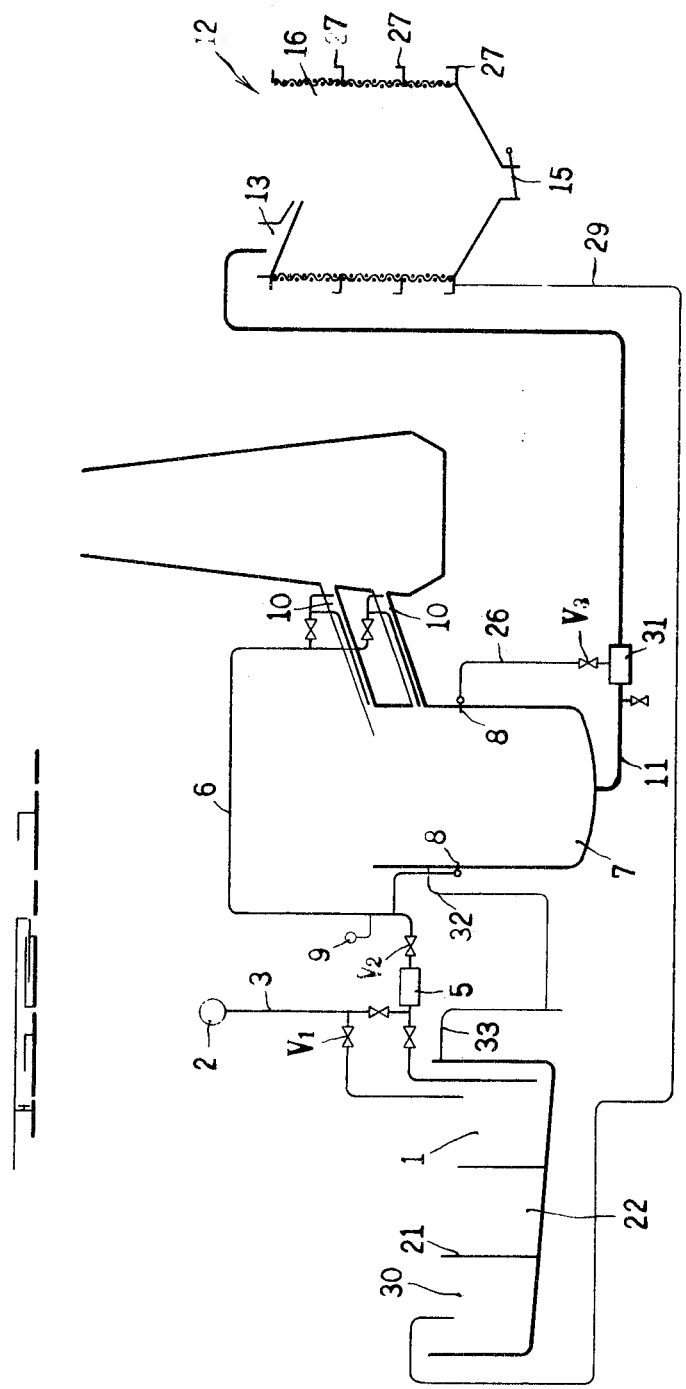

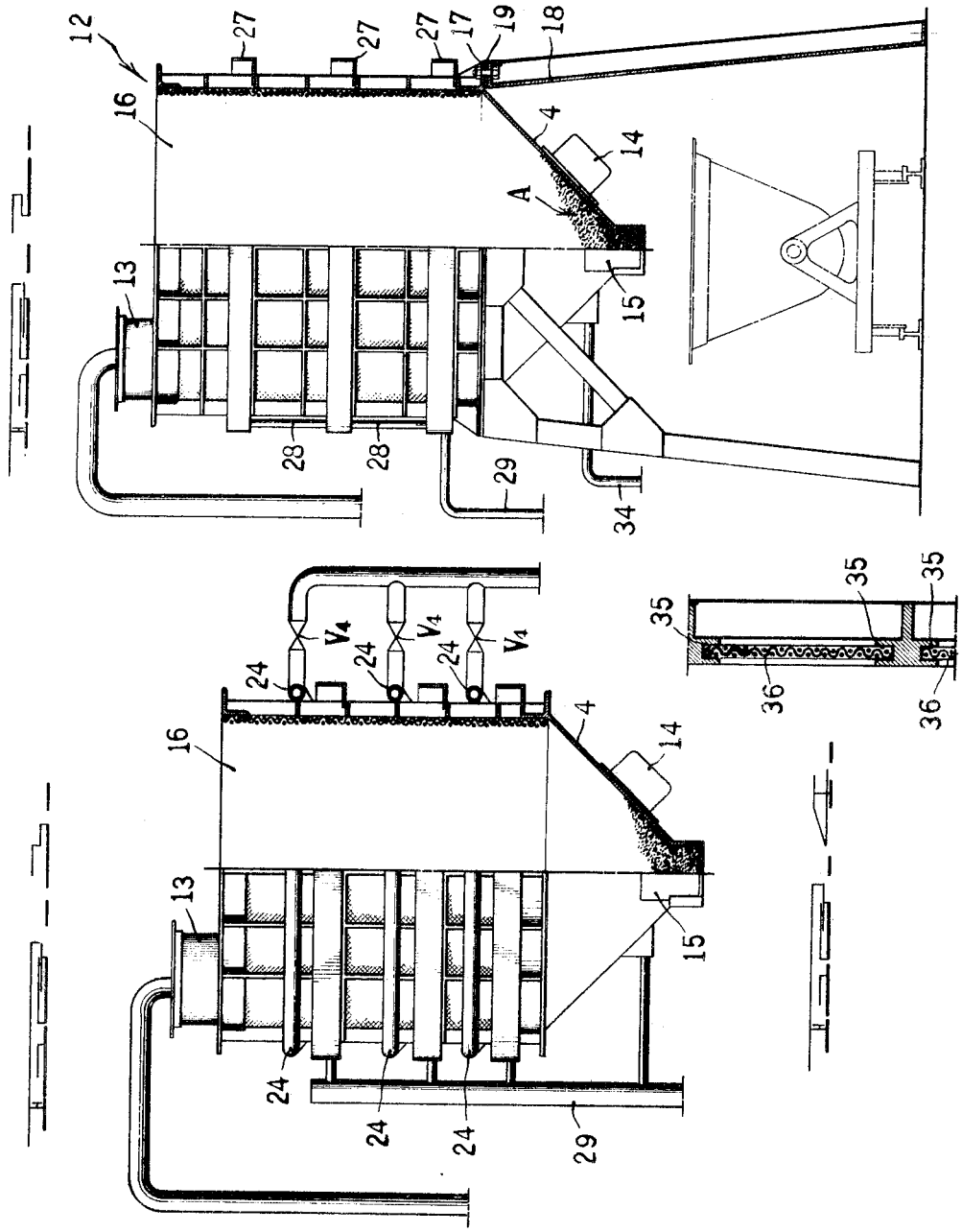

3,508,660
SLAG EXTRACTING APPARATUS
Akira Takano, Ibaragi, Japan, assignor to Rasa Shoji Co., Ltd., Tokyo, Japan
Filed Mar. 21, 1968, Ser. No. 714,912
Claims priority, application Japan, Mar. 25, 1967, 42/18,732
Int. Cl. B01d 35/20, 50/00
U.S. Cl. 210—167                                    5 Claims

ABSTRACT OF THE DISCLOSURE

A slag extracting apparatus comprises an inlet for slag sent out from a blast furnace, an agitating tank provided with a number of water discharging nozzles for discharging water supplied from a reservoir, a dehydrating separator for receiving a mixture of the water and slag passed out from said agitating tank and separating the slag from the water, and a circulation channel for circulating the water separated by said separator into said reservoir through a filter. Said dehydrating separator is provided with a container having a shutter in the bottom portion thereof and constructed of net, and with troughs for receiving and guiding to said circulation channel the water flowing out of the meshes of said container.

---

The present invention relates to a slag extracting apparatus by which grains of slag suitable as cement material are extracted from the masses of slag produced in a blast furnace.

A principal object of the present invention is to provide a novel slag extracting apparatus in which sponge-like masses of slag containing foams sent out from a blast furnace are made into grains of 1 to 3 millimeters in diameter by being agitated and mixed with a small amount of circulating water, and thereafter dehydrated and separated from water, the grains obtained are successively and efficiently extracted.

Another important object of the present invention is to provide a slag extracting apparatus equipped with a separator which is capable of performing a reliable and yet prompt operation of separating the grains of slag from water mixed therewith whereby perfectly dehydrated slag which can be used as a cement material is made obtainable.

Still another object of the present invention is to provide a slag extracting apparatus which is simple in the overall structure and easy to maintain.

Other objects and advantages of the present invention will become apparent from the following detailed description.

FIG. 1 is a diagrammatic front view showing the outline of a slag extracting apparatus in accordance with the present invention;

FIG. 2 is a fragmentary front view on an enlarged scale showing a separation of the apparatus in accordance with the present invention;

FIG. 3 is a fragmentary front view on an enlarged scale showing another modified embodiment of a separator of the apparatus in accordance with the present invention; and FIG. 4 is a fragmentary view on an enlarged scale and in section showing a portion of another modified embodiment of a separator in the apparatus of the present invention.

Referring to the drawings, a reservoir 1 for circulating water is disposed so as to reecive water from a water source 2 located in an elevated position through duct 3 and valve $V_1$. From the reservoir 1 and through a pump 5 and conduit 6 water is supplied to a plurality of water discharging nozzles 8 which are directed toward the interior of an agitating tank 7 of cylindrical form.

In order to increase the pressure of the water to be discharged from the nozzles 8, a valve $V_2$ is installed on the outlet side of the pump 5. This valve $V_2$ is kept closed for a little while after the apparatus is set operating and by opening the valve a desired pressure can be provided to the discharging water. In an intermediate portion of the duct 3 is provided a pressure gauge 9 for measuring precise water pressure.

Guiding channels 10 are connected to the agitating tank 7 to receive sponge-like slag run off from the blast furnace. By the pressure of the water discharged from the nozzles 8, the sponge-like masses of slag passed into this agitating tank are readily broken to small grains and a mixture of water and minutely broken grains of slag of 1 to 3 millimeters in diameter is thus formed in said tank. To the upper peripheral portions of the agitating tank 7 and the reservoir 1 are attached drain troughs 32 and 33 which guide the overflow from the tank when it is filled with water.

Extending from the bottom portion of the agitating tank 7 is an outflow channel 11 for flowing out a mixture of slag and water within the tank and through this channel the mixture is pumped into the upper end portion of a dehydrating separator 12 by means of a sand pump 31. A water supply conduit 26 is connected to the conduit 6 through a valve $V_3$ which is adapted to be opened to have water taken in thereby helping set the sand pump driving.

The details of the previously mentioned slag dehydrating separator is shown in FIG. 2. There is provided a container 16 comprising an upper end portion which has an inlet 13 for receiving the mixture of slag and water passed forward by the sand pump a bottom portion having a shutter 15 and a hopper equipped with a generator 14, and a side wall portion formed of iron net with suitable meshes. By means of a flange portion 17 provided along the external circumferential surface of the container 16 and bolts 20, the container is mounted through interposing cushions 19 on a stationary supporting member 18 so as to be set vibrating. Accordingly, by driving the aforementioned vibration generator 14, the hopper portion of the container 16 can be vibrated on the stationary supporting member 18 thereby preventing slag and the like from clogging up the hopper portion during the water removing operation.

Surrounding the external circumferential surface of the container 16 are annular troughs 27 for receiving the water flowing out through the meshes of the container 16, said troughs being suitably spaced apart vertically. Furthermore, the troughs 27 are communicated to one another by means of connecting pipes 28 and the lowermost trough is further connected to a circulation tank 30 through a circulation channel 29. The water which flows out from the container 16 is therefore sent back to the circulation tank 30 through the circulation channel 29, whereupon the water is further passed through a filter 21 into an adjacent deposit tank 22, where the impurities are deposited, and the water is now sent back to the reservoir 1 to be flowed out once again by the the pump 5. When the water-drained slag A left in the container 16 of the separator is accumulated to a predetermined amount, the shutter is opened to get the slag dropped onto the loading platform of a truck or the like waiting below the shutter for disposal. The water left in the hopper portion 14 is drained by a drainage pipe 34 and the water is therefore completely removed from the slag within the hopper.

In accordance with the slag extracting apparatus of the present invention, lumps of slag sent out from a blast furnace is agitated and made into a mixture of grains of slag and water by use of circulating water, and the mixture thus obtained is passed into a vibrating container for drainage and separation in which the slag is separated from water, the water removed being further filtered to be re-used as circulating water. Since the grains of dehydrated slag are taken out in successive manner, uninterrupted and effective slag extracting operation can be achieved.

Furthermore, extracted in grains of approximately uniform size, slag processed in accordance with the present invention makes an excellent cement material which is extremely economical in that what was conventionally a waste product is now made applicable as a worthy commercial product.

In order to facilitate the removal of small particles of slag clogging up the meshes of the container 16, the apparaus of the present invention can be modified into an embodiment as shown in FIG. 3. In this embodiment, a number of water discharging nozzles 24 are disposed around, and directly toward, the external circumferential surface of the container 16, said nozzles 24 being connected to the previously mentioned conduit 6 through a valve $V_4$. By opening the valve $V_4$, the pressurized water can be discharged aaginst the external circumferential surface of the container to get the slag grains clogging up the meshes readily removed.

To insure a facilitated cleaning operation for the iron net of the container, the present invention may be modified into an embodiment as shown in FIG. 4, in which the iron net portion is divided into the quadrilateral sections 36 of a suitable size to be inserted between upper and lower rails 35 forming the frames in detachable manner. By removing these sections, the iron net can readily be cleaned, or, in case a portion of the net is damaged, the section which involves the broken portion can be replaced, thus facilitating a repair work.

What I claim is:

1. A slag extracting apparatus comprising a reservoir for circulating water provided with a filter therein, an agitating tank provided with a number of water discharging nozzles for discharging water supplied from said reservoir, an inlet for slag sent out from a blast furnace, a dehydrating separator for receiving a mixture of the water and slag passed out from said agitating tank and for separating the slag from the water, a circulation channel for circulating the water separated by said separator into said reservoir through said filter, said dehydrating separator being provided with a container having a shutter in the bottom portion thereof and constructed of net and having troughs for receiving and guiding to said circulation channel the water flowing out of the meshes of said net, and means for providing communications, respectively, between the slag inlet and the agitatiing tank, the agitating tank and the separator, and the separator and the reservoir.

2. A slag extracting apparatus as claimed in claim 1, wherein said container comprises an upper end portion provided with an inlet for receiving a mixture of water and slag, a lower portion having a hopper equipped with said shutter and vibration generator, and a flange portion formed along the outer circumferential surface of said container, said flange portion being attached to the upper end of a stationary supporting member, whereby said container is adapted to be set vibrating on said stationary supporting member by driving said vibration generator.

3. A slag extracting apparatus as claimed in claim 1, wherein the outer circumferential surface of said container is provided with a number of water discharging nozzles directed towards said surface whereby fine particles of slag clogging up the meshes of said container may be readily removed.

4. A slag extracting apparatus as claimed in claim 1, wherein a space sufficiently wide for disposing a truck is formed below said shutter of said dehydrating separator thereby facilitating the operation of carrying out the slag.

5. A slag extracting apparatus as claimed in claim 1, wherein the side wall portion made of net of said container is divided into quadrilateral sections of a suitable size which are inserted between upper and lower rails forming the frames in a detachable manner.

References Cited

UNITED STATES PATENTS

| | | | |
|---|---|---|---|
| 3,326,383 | 6/1967 | Pranoui | 210—167 X |
| 2,738,258 | 3/1956 | Berg | 210—196 X |

JAMES L. DECESARE, Primary Examiner

U.S. Cl. X.R.

210—295, 388